United States Patent
Elsperger et al.

(10) Patent No.: US 11,904,700 B2
(45) Date of Patent: Feb. 20, 2024

(54) METHOD AND DEVICE FOR ADJUSTING A TRANSPORT VEHICLE FOR A CONTAINER-HANDLING SYSTEM

(71) Applicant: KRONES AG, Neutraubling (DE)

(72) Inventors: Stefan Elsperger, Neutraubling (DE); Hartmut Davidson, Neutraubling (DE)

(73) Assignee: KRONES AG, Neutraubling (DE)

( * ) Notice: Subject to any disclaimer, the term of this patent is extended or adjusted under 35 U.S.C. 154(b) by 815 days.

(21) Appl. No.: 16/975,671

(22) PCT Filed: Jan. 17, 2019

(86) PCT No.: PCT/EP2019/051122
§ 371 (c)(1),
(2) Date: Aug. 25, 2020

(87) PCT Pub. No.: WO2019/162001
PCT Pub. Date: Aug. 29, 2019

(65) Prior Publication Data
US 2020/0412229 A1 Dec. 31, 2020

(30) Foreign Application Priority Data
Feb. 26, 2018 (DE) ...................... 10 2018 202 868.0

(51) Int. Cl.
*B60L 13/00* (2006.01)
*B60L 13/06* (2006.01)
*B60L 15/00* (2006.01)

(52) U.S. Cl.
CPC .............. *B60L 13/00* (2013.01); *B60L 13/06* (2013.01); *B60L 15/005* (2013.01); *B60L 2200/26* (2013.01); *H02K 2201/03* (2013.01)

(58) Field of Classification Search
CPC ...... B60L 13/00; B60L 13/06; B60L 2200/26; H02K 2201/03; H02K 41/031; H02K 15/16
See application file for complete search history.

(56) References Cited

U.S. PATENT DOCUMENTS

2008/0246350 A1* 10/2008 Hoppe ................... H02K 1/278
310/12.25
2010/0164306 A1* 7/2010 Shoda ................... H02K 41/03
310/12.31
(Continued)

FOREIGN PATENT DOCUMENTS

| CN | 1948987 A | 4/2007 |
| CN | 103926031 B | 1/2016 |

(Continued)

OTHER PUBLICATIONS

ISA European Patent Office, International Search Report Issued in Application No. PCT/EP2019/051122, dated Apr. 17, 2019, WIPO, 6 pages.
(Continued)

*Primary Examiner* — Thomas Randazzo
(74) *Attorney, Agent, or Firm* — McCoy Russell LLP

(57) ABSTRACT

Method for adjusting a transport vehicle for a container handling system, where the transport vehicle comprises two oppositely disposed secondary parts which can be driven electromagnetically as an armature by way of a linear motor system of the container handling system, wherein in a device for adjusting, a first magnetic force of the first secondary part is determined with a sensor, in that a second magnetic force of the second secondary part is determined with the sensor; and in that the first magnetic force and the second magnetic force are compared with one another and/or with at least one reference force, and the two secondary parts are
(Continued)

adjusted based thereon at the transport vehicle in such a way that the first magnetic force and the second magnetic force are of the same magnitude.

15 Claims, 3 Drawing Sheets

(56) References Cited

U.S. PATENT DOCUMENTS

| | | | | |
|---|---|---|---|---|
| 2016/0380562 | A1* | 12/2016 | Weber | B60L 13/003 310/12.11 |
| 2019/0100389 | A1* | 4/2019 | Neubauer | H02K 7/08 |

FOREIGN PATENT DOCUMENTS

| | | |
|---|---|---|
| DE | 102009018871 A1 | 10/2010 |
| DE | 102013218389 A1 | 3/2015 |
| DE | 102015226139 A1 | 6/2017 |
| DE | 3393946 B1 * | 11/2022 ............ B65G 54/02 |
| EP | 3109998 A1 | 12/2016 |
| JP | S49125211 U | 10/1974 |
| JP | S50109412 A | 8/1975 |
| JP | S60113651 A | 6/1985 |
| JP | 2004254453 A | 9/2004 |
| JP | 2010110121 A | 5/2010 |
| WO | 2007036415 A1 | 4/2007 |

OTHER PUBLICATIONS

State Intellectual Property Office of the People's Republic of China, Office Action and Search Report Issued Application No. 201980015496.0, dated Mar. 11, 2022, 9 pages. (Submitted with Partial Translation).

* cited by examiner

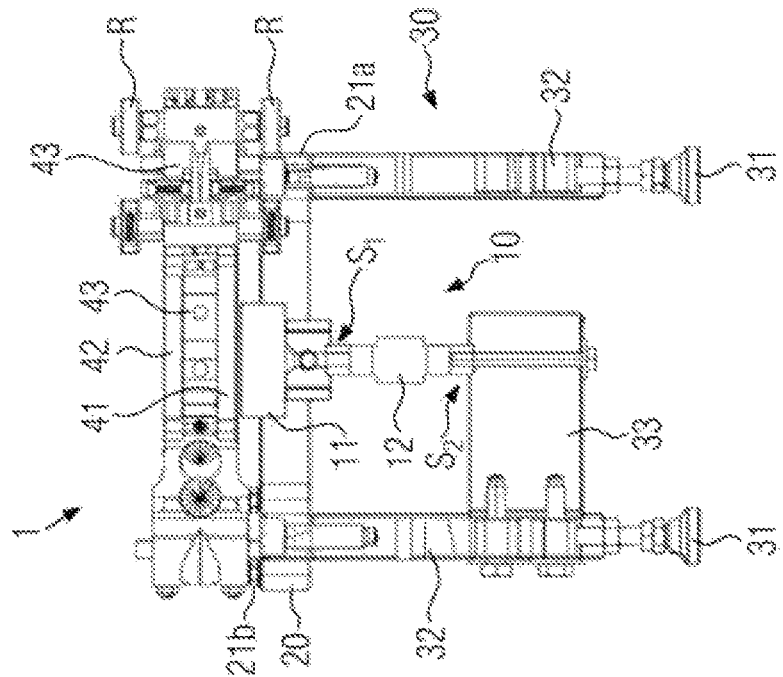
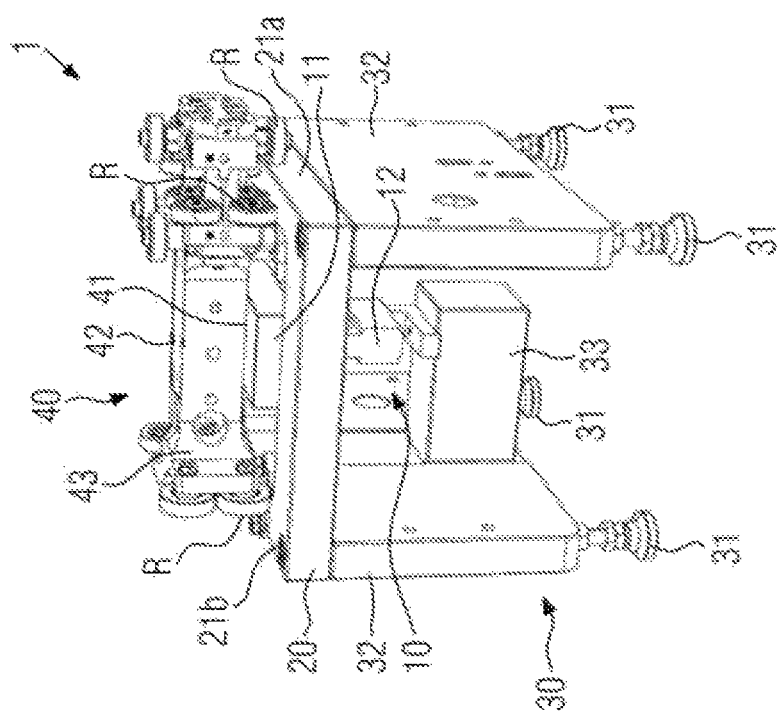

METHOD AND DEVICE FOR ADJUSTING A TRANSPORT VEHICLE FOR A CONTAINER-HANDLING SYSTEM

CROSS-REFERENCE TO RELATED APPLICATIONS

The present application is a U.S. National Phase of International Patent Application Serial No. PCT/EP2019/051122 entitled "METHOD AND DEVICE FOR ADJUSTING A TRANSPORT VEHICLE FOR A CONTAINER-HANDLING SYSTEM," filed on Jan. 17, 2019. International Patent Application Serial No. PCT/EP2019/051122 claims priority to German Patent Application No. 10 2018 202 868.0 filed on Feb. 26, 2018. The entire contents of each of the above-referenced applications are hereby incorporated by reference for all purposes.

TECHNICAL FIELD

The invention relates to a method and a device for adjusting a transport vehicle for a container handling system.

BACKGROUND AND SUMMARY

It is known to employ linear motor systems in container handling systems to individually drive or move transport vehicles (shuttles) for container transport. For example, the transport vehicles are each configured having a container receptacle to receive a container for transport, in particular at the neck finish portion. The linear motor systems are configured with long stators and guide rails in order to individually drive the transport vehicles along one or more transport lanes, in particular to accelerate or decelerate them.

The transport vehicle comprises two oppositely disposed secondary parts for driving which are driven electromagnetically as an armature by way of the linear motor system. Accordingly, the linear motor system is typically formed along a specific transport lane with two long stators between which the two oppositely disposed secondary parts of the transport vehicle run during operation and are driven thereby.

In addition, switches for such linear motor systems are known from DE 10 2013 218 389 A1 or EP 3 109 998 A1 with which the transport vehicles can be branched onto different transport lanes by electromagnetic interaction. As a result, the transport vehicles can be branched from one primary path to two diverging secondary paths. For this purpose, the normal force between one of the two long stators and the corresponding secondary part of the transport vehicle is reduced in a branching region of the switch by way of field weakening, while the normal force on the oppositely disposed side between the long stator and the corresponding secondary part is increased by way of field strengthening, so that the transport vehicle is drawn towards this side and branched off to the corresponding branch path.

The desired magnetic forces in the region of the switch are typically adjusted by precisely adjusting the air gaps between the two oppositely disposed secondary parts and the respective long stators. Due to the fact that the secondary part and the stator iron core are typically protected with sheet metal and in part potted, direct measurement of the air gap is possible only with difficulties or is associated with inaccuracies, respectively. Other influencing parameters such as the field strength tolerances of different batches of secondary parts remain unaccounted for. This method is therefore relatively imprecise. At the same time, very precise adjustment of the normal magnetic force on both sides is required, in particular, for the magnetic switch to operate correctly.

The object of the present invention is therefore to provide a method and a device for adjusting a transport vehicle for a container handling system which enable easier adjustment of the magnetic forces.

To satisfy this object, the invention provides a method for adjusting a transport vehicle for a container handling system.

Due to the fact that the first magnetic force of the first secondary part and the second magnetic force of the second secondary part are determined with the sensor and compared with one another and/or with at least one reference force, deviations from the at least one reference force and/or a difference between the two magnetic forces can be determined. Due to the fact that the two secondary parts on the transport vehicle are adjusted based on this, the deviations or the difference between the two magnetic forces can be compensated for. As a result, the two oppositely disposed secondary parts then act upon the long stators of the linear motor system with the same magnetic force during operation of the container handling system. Consequently, the method enables simple adjustment of the magnetic forces of the transport vehicle for operation with the linear motor system.

It is conceivable that the method for adjusting is carried out in the container handling system or in a manufacturing plant for the container handling system, in particular for the linear motor system. Containers can be transported in the container handling system using the transport vehicle and the linear motor system. Preferably several containers with a corresponding number of such transport vehicles can be transported through the container handling system.

The container handling system can comprise at least one container handling machine, in particular, a beverage processing machine. As a transporter, the container handling system can comprise the linear motor system with several such transport vehicles. It is conceivable that the method is used to adjust all or some of the transport vehicles of the container handling system.

The transport vehicle can be guided with one or more rails of the linear motor system. In the region of a switch, the transport vehicle can be branched off from one transport lane to several downstream transport lanes. Conversely, the transport vehicle can also be guided by the switch from several transport lanes to one downstream transport lane. The two oppositely disposed secondary parts can be driven with two long stators of the linear motor system. The long stators of the linear motor system can be arranged on both sides along the transport lane and form a drive slot in which the two oppositely disposed secondary parts are arranged as armatures during operation of the container handling system.

The transport vehicle can comprise a carrier element on which the two secondary parts are arranged in an oppositely disposed manner. "Oppositely disposed" can presently mean that the two secondary parts are arranged in such a way that their magnetic forces act in the opposite direction upon the linear motor system, in particular upon the two long stators. During operation, the transport vehicle can be guided along the transport lane of the linear motor system by way of rollers. The rollers can preferably act against rail elements of the linear motor system. The transport vehicle can comprise a container receptacle for receiving a container during transport.

In the method for adjusting, the transport vehicle can be placed against the device for adjusting, where the device is configured in particular according to the features described farther below.

After the first magnetic force has been determined, the transport vehicle can be turned around and the second magnetic force can then be determined. This ensures that the magnetically attracting force between the sensor and the first or the second secondary part is of the same magnitude when determining the two magnetic forces.

When the first and the second magnetic forces are determined, the transport vehicle can be placed in a stationary manner against a measuring table of the device for adjusting. As a result, it can be positioned particularly easily at a defined distance of the body of the transport vehicle between the sensor and the first or the second secondary part. "Placing against" can presently mean that the transport vehicle is made to contact the measuring table and/or is detachably connected thereto. The transport vehicle can there in particular be made to contact and/or be detachably connected to at least one contact surface of the measuring table.

When determining the first magnetic force, the transport vehicle can be placed against the measuring table in such a way that the first secondary part faces the sensor, and the transport vehicle can then be turned around and placed against the measuring table in such a way that the second secondary part faces the sensor. As a result, the device for adjusting can be constructed in a particularly simple manner and a single sensor can be used for measuring the two magnetic forces. In other words, when determining the first magnetic force, the transport vehicle can be placed against the measuring table in such a way that the first secondary part is oriented towards a contact surface of the measuring table for the transport vehicle, and the transport vehicle can then be turned around and placed against the measuring table in such a way that the second secondary part is oriented towards the contact surface of the measuring table for the transport vehicle. The contact surface can interact with rollers and/or contact elements of the transport vehicle when the first and the second magnetic forces are determined.

When determining the first and the second magnetic forces, a magnetic field of the first or the second secondary part can act upon the sensor over a distance. This ensures that the first or the second secondary part is not in direct contact with the sensor when the magnetic forces are determined, but that the magnetic fields are measured in an air space.

When the transport vehicle is adjusted, a position of the first and/or the second secondary part on the transport vehicle can be changed by removing or adding at least one spacer element. Positioning the secondary parts could also be done steplessly using push screws or the like. As a result, the air gap to the sensor of the device for adjusting is enlarged or reduced, so that a correspondingly lower or larger magnetic force acts upon the sensor. This allows for a deviation from the at least one reference force and/or differences between the first magnetic force and the second magnetic force to be compensated for. The magnetic forces of the two oppositely disposed secondary parts, which are adjusted by way of the at least one spacer element, then also act accordingly during operation of the transport vehicle. The at least one spacer element can be configured as a plate element, in particular made of sheet metal. At least one of the spacer elements between the carrier element and at least one of the two oppositely disposed secondary parts can preferably be removed or added in order to change the position of the first and/or the second secondary part. It is also conceivable that the position of the first and/or the second secondary part on the transport vehicle is changed continuously by way of push screws. Alternatively, the device could also be used to measure and adjust transport vehicles for single stator applications. In this case, the normal force of the secondary part would be measured for every transport vehicle and set to a target value.

To satisfy the object, the invention furthermore provides a device for adjusting a transport vehicle for a container handling system.

Due to the fact that the device comprises the sensor and the measuring table for stationary placement of the transport vehicle relative to the sensor, and the sensor is configured to determine the magnetic forces, the first magnetic force of the first secondary part and the second magnetic force of the second secondary part can be determined with the sensor prior to the adjustment and compared with one another and/or with at least one reference force. Deviations from the at least one reference force and/or a difference between the two magnetic forces can consequently be determined. Accordingly, the two secondary parts on the transport vehicle can be adjusted such that the deviations or the difference between the two magnetic forces are compensated for. 0} Accordingly, the two oppositely disposed secondary parts then act upon the long stators of the linear motor system with the same magnetic force during operation of the container handling system. The device therefore enables simple adjustment of the magnetic forces of the transport vehicle for subsequent operation with the linear motor system.

The device for adjusting can preferably be configured to carry out the previously described method for adjusting the transport vehicle.

The device for adjusting can be arranged separately from the container handling system. For example, the device for adjusting can be arranged in a manufacturing company for the container handling system. It is also conceivable that the device for adjusting is arranged in a beverage production plant separate from the container handling system.

The device for adjusting can comprise one or more carrier elements on which the measuring table and the sensor are arranged. The carrier elements can comprise plates, struts and feet to hold the measuring table and the sensor. The measuring table can preferably be arranged directly on one of the carrier elements.

For the stationary placement of the transport vehicle, the measuring table can comprise at least one contact surface which interacts with rollers and/or contact elements of the transport vehicle when the magnetic forces are determined. As a result, the transport vehicle can be mounted in a unique position in the device while the magnetic forces are determined. For example, the contact surfaces can be formed by surfaces of a preferably rectangular frame element.

The sensor can comprise a magnetic element for interaction with the secondary parts and a force sensor. As a result, the sensor can be configured in a particularly simple manner. It is conceivable that the magnetic element is made of ferromagnetic material or rare earths. The force sensor can be configured as an S-shaped element which comprises a strain gauge. This gives the force sensor a particularly simple structure. It is also conceivable that the force sensor comprises a piezoelectric element. In particular, the magnetic element can be firmly connected to a force introduction side of the force sensor. Accordingly, a mounting side of the force sensor can be fixedly arranged on one of the carrier elements and/or can be firmly connected to the at least one contact surface. The magnetic force directly acting upon the magnetic element can be determined using this arrangement.

Alternatively, the force sensor can be arranged separate from the magnetic element and a force introduction point of the force sensor can be firmly connected to the at least one contact surface. With this arrangement, the magnetic force between the rollers/contact elements of the transport vehicle can be determined indirectly from the force acting upon the contact surface. The magnetic element and the mounting side of the force sensor can be fixedly arranged on one of the carrier elements.

It is also conceivable that the sensor comprises a Hall element for determining the magnetic forces by way of the Hall effect. This allows the magnetic field strength of the two secondary parts to be measured directly.

BRIEF DESCRIPTION OF THE FIGURES

Further features and advantages of the invention shall be explained in more detail below with reference to the embodiments illustrated in the figures, where

FIGS. 2A-2B show a second embodiment of a device according to the invention for adjusting a transport vehicle in a perspective view obliquely from above and as a sectional view; and;

DETAILED DESCRIPTION

Figure 1A:
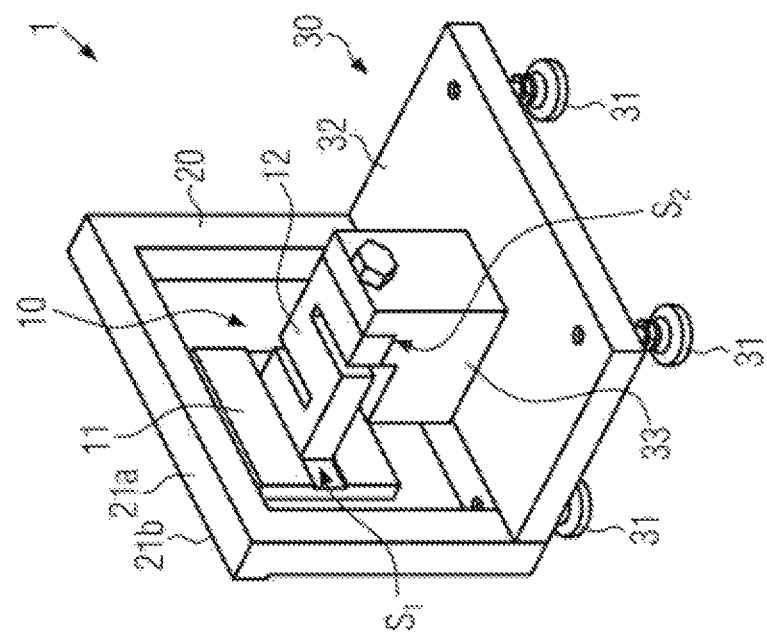
FIGS. 1A-1B show a first embodiment of a device according to the invention for adjusting a transport vehicle in two perspective views obliquely from above.
Figure 1B:
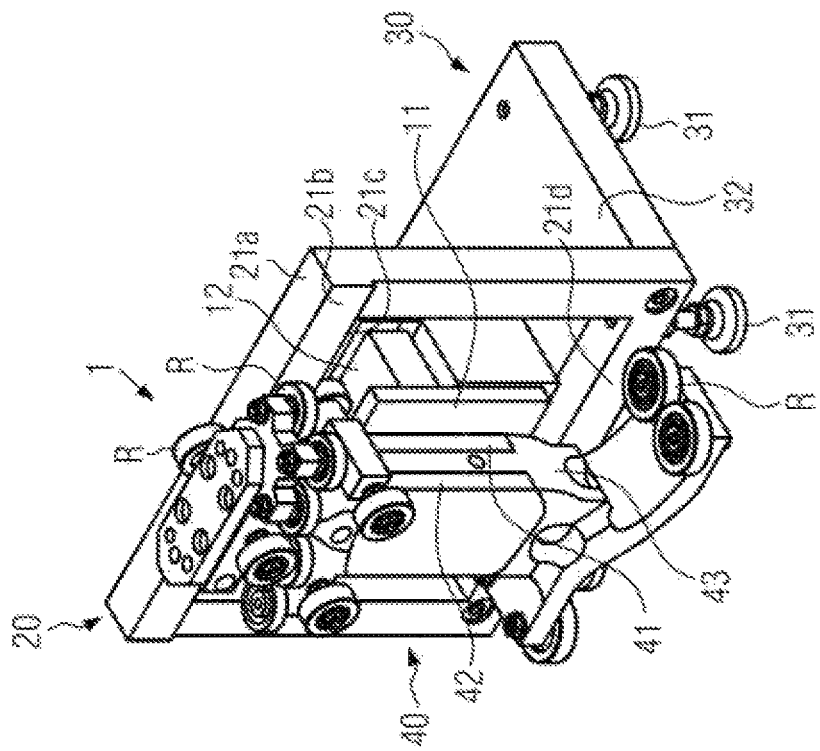

FIGS. 1A-1B show a first embodiment of a device 1 according to the invention for adjusting a transport vehicle 40 in two perspective views obliquely from above.

It can be seen that device 1 comprises a support frame 30 with several carrier elements 31-33 on which sensor 10 and measuring table 20 are arranged. Support frame 30 is there formed by feet 31, plate 32 and sensor receptacle 33. Feet 31 can be placed on the floor or a work bench so that plate 32 extends substantially horizontally and measurement table 20 substantially vertically. In this example, the measuring table can be connected by two screws to plate 32 in such a way that the two form a right angle. With device 1 according to the first embodiment in FIGS. 1A-1B, transport vehicle 40 can consequently be placed on measuring table 20 from the side.

Transport vehicle 40 comprising a carrier 43, two secondary parts 41, 42 and rollers R can additionally be seen.

After the adjustment, rollers R of transport vehicle 40 are guided by way of guide elements, for example rails, along one or more transport lanes during the operation of the container handling system, presently not shown. In addition, secondary parts 41, 42 act as magnets and are driven electromagnetically in the container handling system by way of a linear motor system, presently likewise not shown.

It can also be seen that measuring table 20 comprises contact surfaces 21a, 21b, 21c, 21d for rollers R of transport vehicle 40. As a result, transport vehicle 40 can be placed in a stationary manner against measuring table 20. Contact surfaces 21a, 21b, 21c, 21d can be arranged at least in part at a right angle to one another in order to ensure precise positioning of transport vehicle 40 in the different spatial directions.

It can also be seen that measuring table 20 is formed in a frame-like manner with an internal opening through which sensor 10, in particular magnetic element 11, protrudes.

Sensor 10 comprises magnetic element 11 and force sensor 12 which is presently formed, for example, as an S-shaped element with a strain gauge. In addition, magnetic element 11 is firmly connected to force introduction side $S_1$ of force sensor 12. In contrast, mounting side $S_2$ of force sensor 12 is firmly connected to sensor receptacle 33. A magnetic force acting upon magnetic element 11 can consequently be measured by way of force sensor 12 as a force between magnetic element 11 and sensor receptacle 33.

When determining the magnetic force, transport vehicle 40 is placed against measuring table 20 by way of rollers R such that first secondary part 41 faces sensor 10. A measurement of the first magnetic force acting upon magnetic element 11 is then taken using sensor 10. Transport vehicle 40 is then turned around and placed against measuring table 20 in such a way that second secondary part 42 faces sensor 10. A measurement of the second magnetic force acting upon magnetic element 11 is subsequently taken. The first magnetic force and the second magnetic force are then compared with one another and/or with at least one reference force. If the first or the second magnetic force deviates too much from the at least one reference force and/or from each other, then they are adjusted in such a way that the first magnetic force and the second magnetic force are of the same magnitude.

The magnetic forces of first and second secondary parts 41, 42, respectively, can be adjusted by removing or adding at least one spacer element between respective secondary parts 41, 42 and carrier 43. This can change the distance between first and second secondary parts 41, 42 and sensor 10, as a result of which the magnetic forces can be adjusted accordingly.

FIGS. 2A-2B show a second embodiment of a device 1 according to the invention for adjusting transport vehicle 40 in a perspective view obliquely from above and as a sectional view.

Device 1 in FIGS. 2A-2B differs from the embodiment in FIGS. 1A-1B only by support frame 30 and the horizontal arrangement of measuring table 20.

It can be seen that support frame 30 comprises two substantially vertically extending plates 32, where feet 31 arranged at their lower ends and measuring table 20 is arranged at their upper ends. As a result, measuring table 20 extends substantially horizontally, similar to a table top, between the two plates 32. The configuration of measuring table 20 for the remainder corresponds to the configuration previously described with reference to FIGS. 1A-1B.

In addition, it can be seen that sensor receptacle 33 is firmly connected to one of the two plates 32 and protrudes therefrom at a right angle, for example, as seen in FIG. 2B, with plate 32 at the left. However, it is also conceivable that sensor receptacle 33 is connected to plate 32 at the right-hand side or to both plates 32.

Consequently, mounting side $S_2$ of force sensor 12 is firmly connected to sensor receptacle 33 and force introduction side $S_1$ to magnetic element 11. Magnetic element 11 in turn protrudes upwardly through the opening of measuring table 20 in order to ensure the smallest possible spacing from one of the two secondary parts 41, 42.

With device 1 according to the second embodiment in FIGS. 2A-2B, transport vehicle 40 can consequently be placed on measuring table 20 from above.

For the remainder, the first and second magnetic forces of first and second secondary parts 41, 42 are determined in accordance with the procedure previously described with reference to the first embodiment.

With devices 1 according to the first and the second embodiments, the magnetic forces of first and second secondary parts 40, 42 can therefore be easily determined and adjusted so that they are substantially of the same magnitude. It is thus ensured during the operation of the container handling system that transport vehicle 40 is steered towards the desired branch-off when passing through a switch.

As an alternative to the second embodiment in FIGS. 2A-2B, it is also conceivable that magnetic element 11 is firmly connected to sensor receptacle 33 (for example by way of a connecting element) and one or more force sensors are arranged between measuring table 20 and plates 32. As a result, the magnetic forces can be determined indirectly from the forces acting from rollers R upon measuring table 20.

Figure 3:
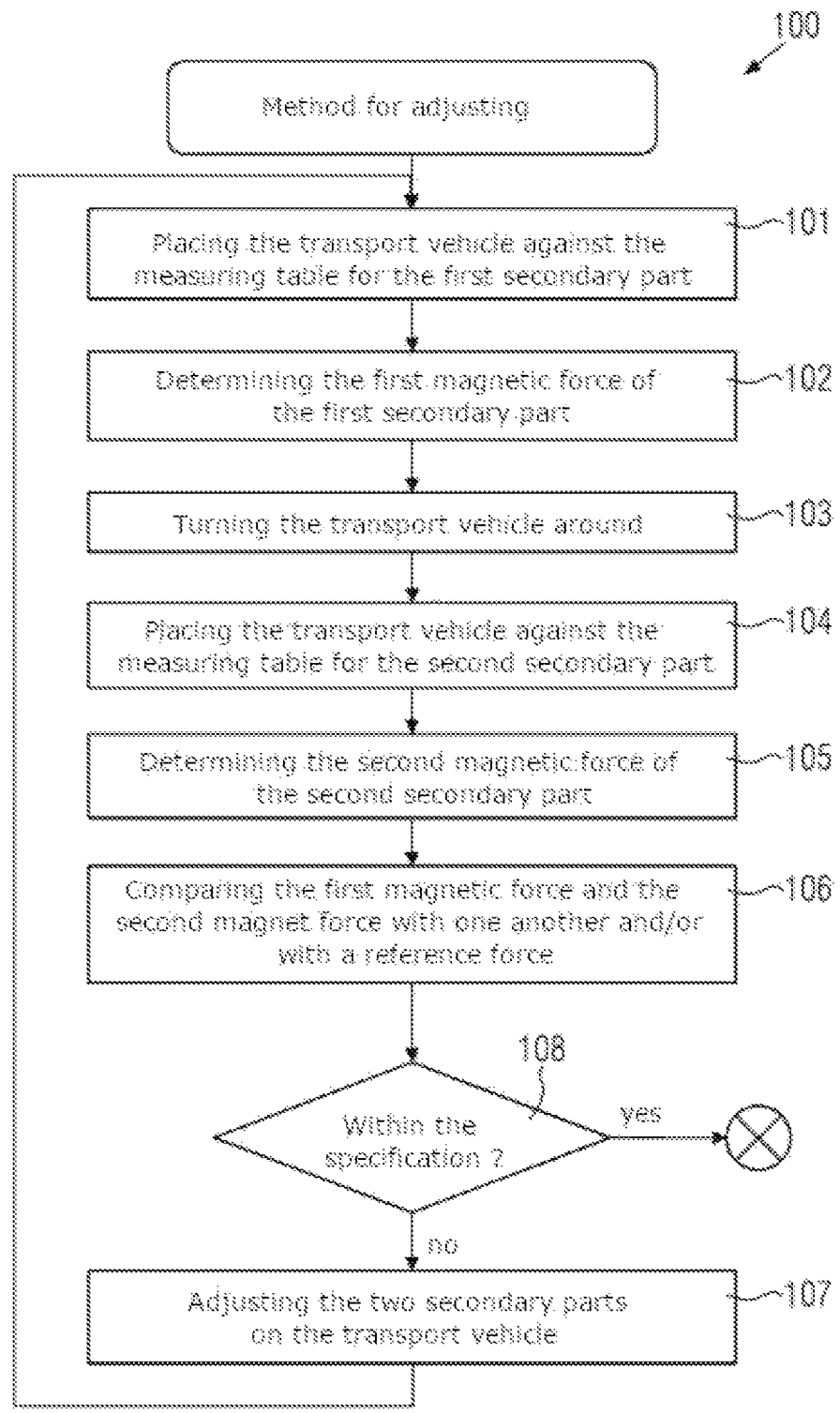
FIG. 3 shows an embodiment of a method according to the invention for adjusting a transport vehicle as a flow chart.

FIG. 3 shows an embodiment of a method 100 according to the invention for adjusting a transport vehicle as a flow chart. Method 100 can be carried out with device 1 according to one of the two embodiments in FIG. 1A-1B or 2A-2, respectively, for adjusting transport vehicle 40.

In step 101, the transport vehicle is first placed in a stationary manner against the measuring table, so that the first secondary part faces the sensor.

The first magnetic force of the first secondary part is then determined in step 102. The magnetic field acts, for example, upon a magnetic element which in turn exerts a corresponding force on a force sensor. For example, the force sensor forwards the force measured in this manner as a signal to a display or a computer system, so that it can be recorded as the first magnetic force of the first secondary part.

In step 103, the transport vehicle is then turned around and in step 104 placed against the measuring table in such a way that the second secondary part faces the sensor.

In step 105, the second magnetic force of the second secondary part is subsequently determined in the same way as in step 1 or 2 and recorded as the second magnetic force of the second secondary part.

The first magnetic force and the second magnetic force are now compared with one another and/or with at least one reference force. This makes it possible to determine whether the first magnetic force and the second magnetic force are within a desired specification or are of the same magnitude, respectively.

If this is not the case (decision 108), then the two secondary parts on the transport vehicle are adjusted in step 107, and steps 101-106 are carried out again until the first magnetic force and the second magnetic force are within the desired specification. The two secondary parts are adjusted, for example, by changing their position on the transport vehicle by removing or adding at least one spacer element.

A particularly simple adjustment of the two magnetic forces of the first and second secondary parts on the transport vehicle is therefore possible using method 100, so that the transport vehicle can be reliably driven also through switches during operation of the container handling system.

It is understood that the features mentioned above in the embodiments described are not restricted to these feature combinations but are also possible individually or in any other feature combination.

The invention claimed is:

1. A method for adjusting a transport vehicle for a container handling system, where said transport vehicle comprises two oppositely disposed secondary parts which are electromagnetically drivable as an armature by way of a linear motor system of said container handling system, the method comprising:
   determining a first magnetic force of a first secondary part of said two oppositely disposed secondary parts with a sensor,
   determining a second magnetic force of a second secondary part of said two oppositely disposed secondary parts with said sensor, and
   comparing the first magnetic force and the second magnetic force with one another and/or with at least one reference force and said two oppositely disposed secondary parts are adjusted based thereon at said transport vehicle such that the first magnetic force and the second magnetic force are of a same magnitude.

2. The method according to claim 1, where said transport vehicle is turned around after the first magnetic force has been determined and the second magnetic force is then determined.

3. The method according to claim 1, where a respective magnetic field of said first and said second secondary part acts upon said sensor over a distance when the first and the second magnetic forces are determined.

4. The method according to claim 1, where a position of said first and/or said second secondary part on said transport vehicle is changed by removing or adding at least one spacer element when said transport vehicle is adjusted.

5. The method according to claim 1, where said transport vehicle is placed in a stationary manner against a measuring table of said device for adjusting when the first and the second magnetic force is determined.

6. The method according to claim 5, where said transport vehicle is placed against said measuring table such that said first secondary part faces said sensor when the first magnetic force is determined, and said transport vehicle is then turned around and placed against said measuring table such that said second secondary part faces said sensor.

7. The method according to claim 5, where said transport vehicle is placed against said measuring table such that said first secondary part is oriented towards a contact surface of said measuring table for said transport vehicle when the first magnetic force is determined, and said transport vehicle is then turned around and placed against said measuring table such that said second secondary part is oriented towards said contact surface of said measuring table for said transport vehicle.

8. A device for adjusting a transport vehicle for a container handling system, where said transport vehicle comprises at least one secondary part, which is movable electromagnetically as an armature by way of a linear motor system of said container handling system, wherein
   said device comprises a sensor and a measuring table for stationary placement of said transport vehicle relative to said sensor, and
   said sensor is configured to determine magnetic forces in order to determine a magnetic force of a first secondary part of said at least one secondary part.

9. The device according to claim 8, where said sensor comprises a Hall element for determining the magnetic forces by way of Hall effect.

10. The device according to claim 8, where said measuring table for the stationary placement of said transport vehicle comprises at least one contact surface which interacts with rollers and/or contact elements of said transport vehicle when the magnetic forces are determined.

11. The device according to claim 10, where a force sensor is arranged separately from a magnetic element of said sensor and a force introduction point of said force sensor is firmly connected to said at least one contact surface.

12. The device according to claim 8, where said sensor comprises a magnetic element for interaction with said at least one secondary part and a force sensor.

13. The device according to claim 12, where said magnetic element is firmly connected to a force introduction side of said force sensor.

14. The device according to claim 8, wherein said at least one secondary part comprises two oppositely disposed secondary parts.

15. The device according to claim 14, wherein said sensor is configured to determine the magnetic forces in order to determine a magnetic force of a second secondary part of said two oppositely disposed secondary parts.

* * * * *